United States Patent
Kishi et al.

(10) Patent No.: US 8,749,085 B2
(45) Date of Patent: Jun. 10, 2014

(54) GAS TURBINE CONTROL DEVICE AND GENERATING SYSTEM

(75) Inventors: Makoto Kishi, Tokyo (JP); Yasuo Fujishima, Tokyo (JP); Takashi Sonoda, Tokyo (JP); Koichiro Hirato, Tokyo (JP); Yasutsugu Takata, Tokyo (JP); Fuminori Fujii, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/818,257

(22) PCT Filed: Nov. 28, 2011

(86) PCT No.: PCT/JP2011/077375
§ 371 (c)(1),
(2), (4) Date: Feb. 21, 2013

(87) PCT Pub. No.: WO2012/073886
PCT Pub. Date: Jun. 7, 2012

(65) Prior Publication Data
US 2013/0147208 A1     Jun. 13, 2013

(30) Foreign Application Priority Data
Nov. 30, 2010 (JP) ................. 2010-267718

(51) Int. Cl.
- F01D 15/10 (2006.01)
- F02C 6/00 (2006.01)
- H02K 7/18 (2006.01)
- H02P 9/04 (2006.01)
- F02C 9/00 (2006.01)

(52) U.S. Cl.
USPC ............ 290/52; 60/39.281; 60/773

(58) Field of Classification Search
USPC ............ 290/52; 60/39.281, 773
See application file for complete search history.

(56) References Cited

U.S. PATENT DOCUMENTS 3,844,114 A * 10/1974 Nonnenmann et al. ........ 60/791
4,134,258 A * 1/1979 Hobo et al. .................... 60/790
(Continued)

FOREIGN PATENT DOCUMENTS

| JP | 5-18272 A | 1/1993 |
| JP | 11-236825 A | 8/1999 |

(Continued)

OTHER PUBLICATIONS

International Search Report for PCT/JP2011/077375, mailing date of Feb. 7, 2012.

(Continued)

*Primary Examiner* — Pedro J Cuevas
(74) *Attorney, Agent, or Firm* — Westerman, Hattori, Daniels & Adrian, LLP

(57) ABSTRACT

Provided is a gas turbine control device that is used in a generating facility including a gas turbine and a generator for generating power when at least rotational power of the gas turbine is transmitted, the gas turbine control device including a first control section for obtaining a first fuel control command for causing generator output to follow a generator output set value decided based on a demand load, where the first control section has a feedback control section (60), and the feedback control section (60) includes a subtraction section (62) for calculating a deviation of the generator output with respect to the generator output set value, a PI control section (64) provided in a later stage of control than the subtraction section (62), and a peak suppression section (66) for suppressing a peak in amplitude characteristics of the generator or a utility grid including the generator.

16 Claims, 8 Drawing Sheets

(56) References Cited

U.S. PATENT DOCUMENTS

| | | | | |
|---|---|---|---|---|
| 4,327,547 | A * | 5/1982 | Hughes et al. | 60/39.463 |
| 4,341,071 | A * | 7/1982 | Abo et al. | 60/790 |
| 4,543,782 | A * | 10/1985 | Fitzmaurice | 60/39.281 |
| 5,203,159 | A * | 4/1993 | Koizumi et al. | 60/773 |
| 5,272,637 | A * | 12/1993 | Urushidani et al. | 701/100 |
| 5,636,507 | A * | 6/1997 | Rajamani et al. | 60/773 |
| 6,164,057 | A * | 12/2000 | Rowen et al. | 60/39.27 |
| 6,230,479 | B1 | 5/2001 | Kawamura et al. | 60/773 |
| 6,405,522 | B1 * | 6/2002 | Pont et al. | 60/39.281 |
| 7,530,216 | B2 * | 5/2009 | Tsuzuki et al. | 60/39.281 |
| 7,832,191 | B2 * | 11/2010 | Osakabe et al. | 60/39.281 |
| 2004/0237537 | A1 | 12/2004 | McKelvey et al. | 60/773 |
| 2006/0225403 | A1 * | 10/2006 | Tsuzuki et al. | 60/39.281 |
| 2006/0233637 | A1 | 10/2006 | Yakushi et al. | 415/13 |
| 2009/0100822 | A1 * | 4/2009 | Osakabe et al. | 60/39.281 |
| 2013/0167441 | A1 * | 7/2013 | Sevastyanov | 48/210 |

FOREIGN PATENT DOCUMENTS

| | | |
|---|---|---|
| JP | 11-324726 A | 11/1999 |
| JP | 2003-172154 A | 6/2003 |
| JP | 2003-239764 A | 8/2003 |
| JP | 2004-190631 A | 7/2004 |
| JP | 2006-257925 A | 9/2006 |
| JP | 2010-121598 A | 6/2010 |

OTHER PUBLICATIONS

Written Opinion of the International Searching Authority for PCT/JP2011/077375, mailing date of Feb. 7, 2012.

* cited by examiner

GAS TURBINE CONTROL DEVICE AND GENERATING SYSTEM

TECHNICAL FIELD

The present invention relates to a gas turbine control device and a generating system.

BACKGROUND ART

Generally, in a gas turbine generating facility, the amount of fuel supply to a gas turbine is controlled such that generator output follows a demand load of a utility grid. For example, PTL 1 discloses adjusting generator output by controlling a degree of opening of a fuel control valve, and causing the generator output to follow a demand load, by inputting a deviation of the generator output with respect to a generator output set value (LDSET) set based on the demand load of a utility grid into a PI controller and performing proportional integral calculation based on this deviation.

CITATION LIST

Patent Literature

{PTL 1} Japanese Unexamined Patent Application, Publication No. 2010-121598

SUMMARY OF INVENTION

Technical Problem

In a gas turbine generating facility, hunting sometimes occurs in generator output at the time of test operation or immediately after loading when the load is low. However, conventionally, since the main cause of such hunting was unknown, no effective method for solving the hunting in the generator output was established.

The present invention is made in view of the above situation, and its object is to provide a gas turbine control device and a generating system capable of suppressing hunting occurring in generator output in a low load range below a rated load such as during test operation or immediately after loading.

Solution to Problem

To solve the above-mentioned problem, the present invention employs the following solutions.

A first aspect of the present invention provides a gas turbine control device to be used in a generating facility including a gas turbine and a generator for generating power when at least rotational power of the gas turbine is transmitted, the gas turbine control device including a first control section for obtaining a first fuel control command for causing generator output to follow a generator output set value decided based on a demand load, where the first control section includes a feedback control section, and where the feedback control section includes a subtraction section for calculating a deviation of the generator output with respect to the generator output set value, a proportional integral calculation provided in a later stage of control than the subtraction section, and a peak suppression section for suppressing a peak in amplitude characteristics of the generator or a utility grid including the generator (a first aspect).

When conducting an analysis of frequency characteristics or the like with respect to a generator and a generator grid including the generator to find out the cause of hunting in generator output (gas turbine output) occurring mainly at the time of low load, a resonance peak was identified, as shown in FIG. 12, near 1 Hz in the amplitude characteristics, and oscillation of natural frequency excited along a rotation axis of the generator was newly perceived as the cause of hunting in the generator output. Therefore, if the resonance peak can be suppressed, hunting in the generator output can be suppressed or prevented. According to the first aspect of the present invention, with the first control section for obtaining a first fuel control command for causing generator output to follow a generator output set value decided based on a demand load, the feedback control section of the first control section includes a peak suppression section for suppressing a peak in amplitude characteristics of the generator or a utility grid including the generator. Hunting in the generator output can thereby be suppressed, and the stability of control can be increased.

In the first aspect of the present invention, "gas turbine output" refers to power, among generator output, generated when only the rotational power of a gas turbine is transmitted. That is, with a gas turbine combined cycle plant (hereinafter, referred to as "GTCC plant") including a gas turbine and a steam turbine, generator output is the total of gas turbine output and steam turbine output, but in this case, "gas turbine output" means the value obtained by subtracting the steam turbine output from the generator output.

Also, the amplitude characteristics shown in FIG. 12 are obtained based on a GTCC model shown in FIG. 5 described later, for example, and the amplitude characteristics are shown where the generator output set values are 3%, 50% and 100%, respectively, of the rating, for example.

In the first aspect of the present invention, the peak suppression section may include a multiplier section, provided between the subtraction section and the proportional integral calculation, for multiplying an input signal by a gain, and a first gain adjustment section for adjusting the gain of the multiplier section according to output of the gas turbine, where the first gain adjustment section may set a gain given at a time of partial load below a rated load to be smaller than a gain given at a time of the rated load (a second aspect).

According to such a configuration, for example, a deviation of generator output with respect to a generator output set value is obtained by the subtraction section, this deviation is multiplied by a predetermined gain by the multiplier section, and the deviation which has been multiplied by the gain is input to the proportional integral calculation. In this case, with respect to the gain to be multiplied by the multiplier section in the multiplication, a gain that is given at the time of partial load below a rated load is adjusted by the first gain adjustment section to be smaller than a gain given at the time of the rated load. Here, as shown in FIG. 4, in a region where the gas turbine output is small (that is, at the time of partial load), the sensitivity of the gas turbine output to fuel flow rate is high, and oscillation is easily excited by the generator in this output region. Thus, by setting a gain at the time of partial load to be smaller than a gain at the time of rated load, the oscillation excitation by the generator can be prevented, and hunting in the generator output can be suppressed.

In the second aspect of the present invention, the first gain adjustment section preferably increases the gain according to an increase in gas turbine output (a third aspect).

As shown in FIG. 4, as the gas turbine output increases, the sensitivity to the fuel flow rate decreases, resulting in stable control. Therefore, by increasing the gain according to the increase in the gas turbine output, control can be stabilized, and the following capability of the generator output to the generator output set value decided based on a demand load can be enhanced.

According to the second aspect or the third aspect of the present invention, the first control section may further include a hunting determination section for determining whether or not hunting is occurring in the generator output, and a second gain adjustment section for reducing the gain set by the first gain adjustment section, if hunting is determined by the hunting determination section to be occurring (a fourth aspect).

According to such a configuration, since whether or not hunting is occurring is determined by the hunting determination section, and the second gain adjustment section reduces the gain set by the first gain adjustment section if hunting is occurring, hunting in the generator output can be reliably solved.

According to the fourth aspect of the present invention, if the hunting is determined by the hunting determination section to not be occurring, the second gain adjustment section may increase the gain set by the first gain adjustment section (a fifth aspect).

In the case that hunting is not occurring in the gas turbine output, the gain set by the first gain adjustment section is adjusted by the second gain adjustment section in the direction of increasing, and the following capability may further be enhanced.

In any of the second to fifth aspects of the present invention, the peak suppression section may further include a low-pass filter that cuts off a signal of a predetermined frequency or higher where a peak is present in the amplitude characteristics, and output generator output which has been filtered to the subtraction section of the feedback control section (a sixth aspect).

For example, it can be seen from the amplitude characteristics shown in FIG. 12 that a peak is present near 1 Hz. Accordingly, by inputting, as an input signal, to the subtraction section, generator output from which at least a high-frequency component of a frequency where a peak is present or higher is cut off by the low-pass filter, a resonance peak can be effectively suppressed. Also, since the frequency band necessary for the output control for a gas turbine is about 0.2 Hz or lower, and a frequency component not necessary for the output control for a gas turbine is cut off, no influence is exerted on the output control.

In the first aspect of the present invention, the peak suppression section may include a low-pass filter to which the gas turbine output is input as an input signal and that cuts off a signal, included in the input signal, of a predetermined frequency or higher where a peak is present in the amplitude characteristics, and generator output which has passed through the low-pass filter may be input to the subtraction section (a seventh aspect).

For example, it can be seen from the amplitude characteristics shown in FIG. 12 that a peak is present near 1 Hz. Accordingly, by inputting, as an input signal, to the subtraction section, generator output from which at least a high-frequency component of a frequency where a peak is present or higher is cut off by the low-pass filter, a resonance peak can be effectively suppressed. Also, since the frequency band necessary for the output control for a gas turbine is about 0.2 Hz or lower, and a frequency component not necessary for the output control for a gas turbine is cut off, no influence is exerted on the output control.

According to the first aspect of the invention, the peak suppression section may include a calculation section in which a transfer function for an inverse characteristic model of the generator is set, and generator output which has passed through the calculation section may be input to the subtraction section (an eighth aspect).

According to such a configuration, by using the calculation section, a component unique to the generator is removed, and only the component of mechanical output will remain. Then, an estimated signal of the mechanical output from which unique information of the generator has been removed is input to the subtraction section of the feedback control section as an input signal. By removing, in this manner, the characteristics of the generator which are the cause of hunting, the peak of the amplitude characteristics shown in FIG. 12 can be eliminated, and hunting in the gas turbine output can be suppressed.

A ninth aspect of the present invention provides a generating system including a gas turbine, and any of the gas turbine control devices described above (a ninth aspect).

Advantageous Effects of Invention

According to the present invention, an effect that hunting in generator output occurring when a load is lower than a rated load can be suppressed is achieved.

DESCRIPTION OF EMBODIMENTS

Hereinafter, embodiments of a control device for a gas turbine and a generating system according to the present invention will be described with reference to the drawings.

First Embodiment

In the following, a first embodiment of the present invention will be described with reference to the drawings.

Figure 1:
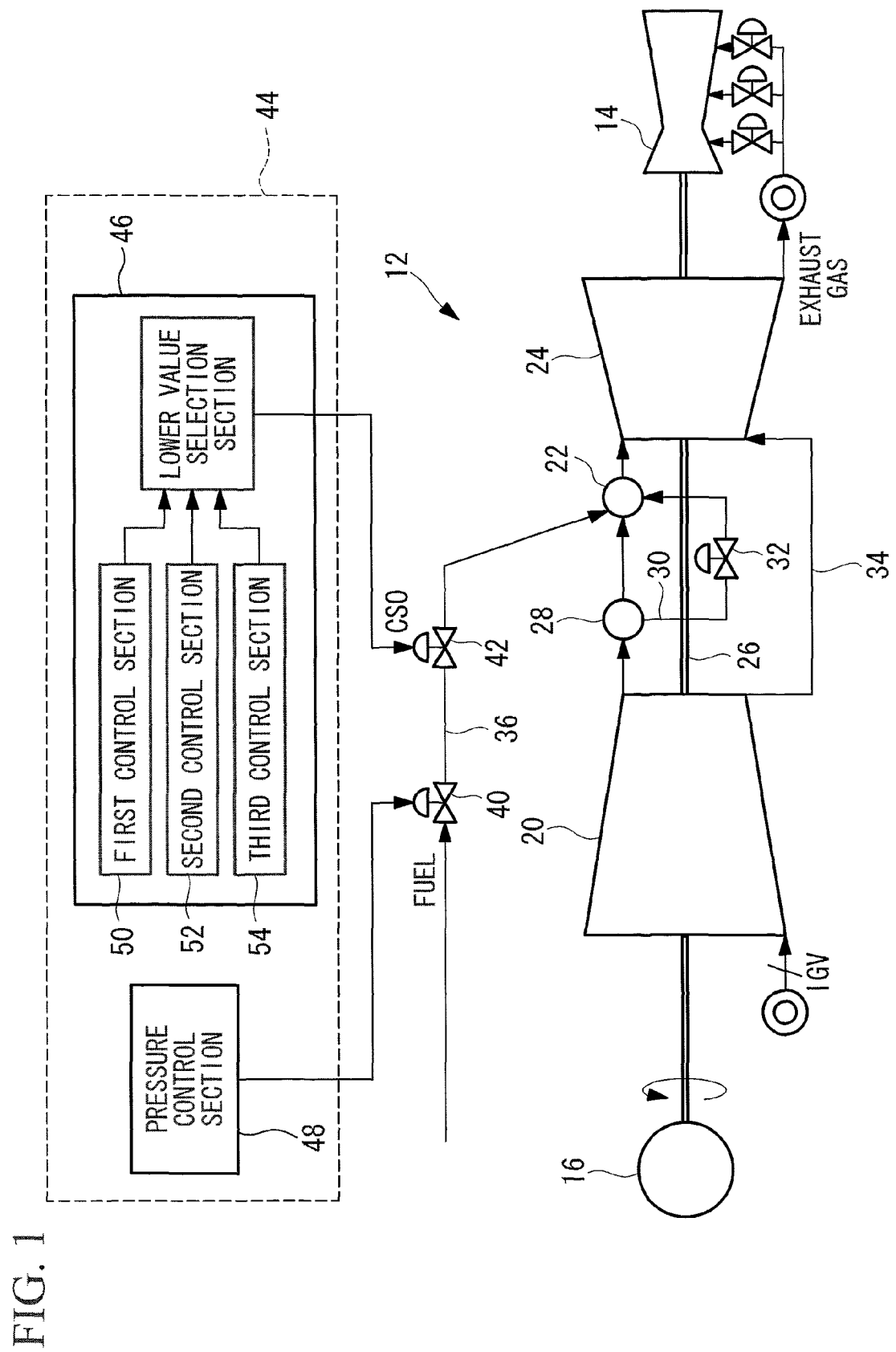
FIG. 1 is an overall configuration diagram of a gas turbine combined cycle plant according to a first embodiment of the present invention.

FIG. 1 is an overall configuration diagram of a GTCC plant according to the first embodiment. The GTCC plant includes a gas turbine 12, a steam turbine 14, and a generator 16.

The gas turbine 12 includes a compressor 20 a combustor 22 and a turbine 24.

The compressor 20 compresses air taken in from an air inlet and produces compressed air by being driven by a rotating shaft 26. The combustor 22 injects fuel to the compressed air which has been introduced into a chamber 28 from the compressor 20 and generates high-temperature/high-pressure combustion gas. The turbine 24 is rotatingly driven by combustion gas generated in the combustor 22.

A bypass pipe 30 is provided between the chamber 28 and the combustor 22, and when a combustor bypass valve 32 is opened in a state where the air in the combustor 22 gets low due to an output fluctuation of the turbine 24, the bypass pipe 30 becomes a passage for introducing the air in the chamber 28 into the combustor 22. Also, an extraction steam pipe 34 for introducing air for cooling from the compressor 20 into the turbine 24 is provided between the compressor 20 and the turbine 24.

The steam turbine 14 collects heat from exhaust gas from the turbine 24 and generates steam, and is rotatingly driven by the steam. The turbine 24, the steam turbine 14, the compressor 20 and the generator 16 are joined by the rotating shaft 26, and the rotational power occurring in the turbine 24 and the steam turbine 14 is transmitted to the compressor 20 and the generator 16 by the rotating shaft 26. Then, the generator 16 generates power by the rotational power of the turbine 24 and the steam turbine 14.

Furthermore, a fuel supply pipe 36 for supplying fuel is connected to the combustor 22. Fuel for which the differential pressure before and behind a flow rate adjustment valve 42 has been adjusted by a pressure adjustment valve 40 and whose flow rate has been adjusted by the flow rate adjustment valve 42 is supplied to the fuel supply pipe 36. The combustor 22 mixes the fuel supplied from the fuel supply pipe 36 with the compressed air so as to combust the fuel.

A gas turbine control device 44 includes a flow rate control section 46 and a pressure control section 48. The flow rate control section 46 acquires, as input signals, quantities of state regarding an operation state and a temperature state of the gas turbine 12, and calculates a fuel flow rate command CSO for controlling the fuel flow rate to be supplied to the combustor 22 based on the input signals. The quantity of state regarding the operation state may be output or rotation speed of the gas turbine 12, for example, and the quantity of state regarding the temperature state may be exhaust gas temperature, for example. Specifically, the flow rate control section 46 includes, in addition to a first control section 50 for obtaining a first fuel control command for causing generator output to follow a generator output set value that is decided based on a demand load, a second control section 52 for obtaining a second fuel control command for causing the rotation speed of the gas turbine 12 to follow a predetermined rotation speed command, a third control section 54 for obtaining a third fuel control command by which the exhaust gas temperature does not exceed a predetermined exhaust gas temperature upper limit, and the like.

Then, a final fuel control command CSO is decided with reference to the first to third fuel control commands obtained by the control sections 50, 52 and 54. The degree of opening of the flow rate adjustment valve 42 is controlled based on this fuel control command CSO.

The pressure control section 48 obtains the amount of control of a pressure adjustment valve for causing fuel pressure to be supplied to the combustor 22 to match target fuel pressure.

Figure 2:
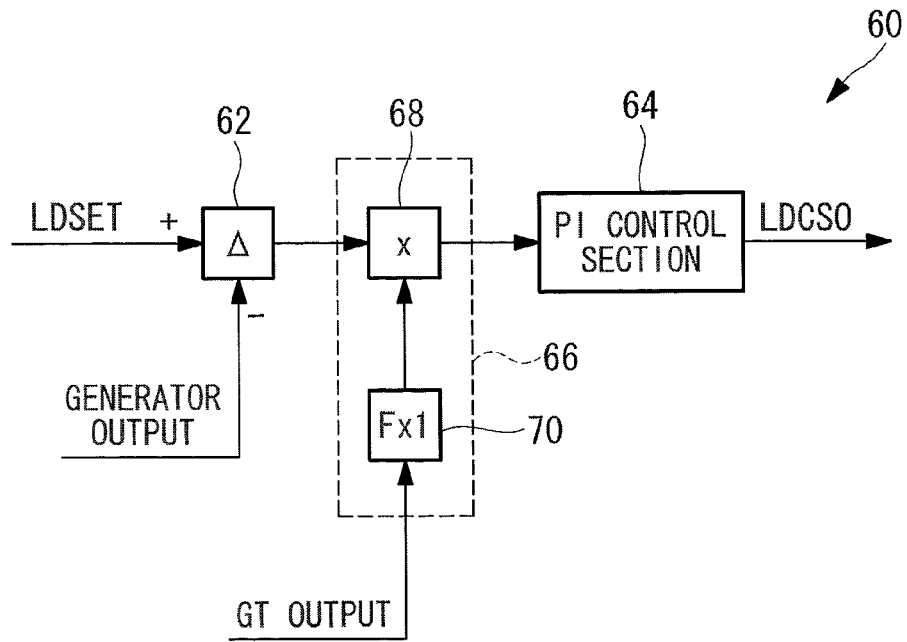
FIG. 2 is a diagram showing a functional block diagram of a first control section shown in FIG. 1.

FIG. 2 is a diagram showing a functional block diagram of the first control section 50 of the flow rate control section 46 of the gas turbine control device 44 described above. As shown in FIG. 2, the first control section 50 includes a feedback control section 60 for obtaining the first fuel control command for causing generator output to follow a generator output set value that is decided based on a demand load.

A subtraction section 62, a PI control section 64, and a peak suppression section 66 for suppressing hunting in generator output occurring at the time of partial load operation or the like are included in the feedback control section 60. The peak suppression section 66 serves a function of suppressing a peak in the amplitude characteristics of the generator 16 or a utility grid including the generator 16, and specifically, the peak suppression section 66 includes a multiplier section 68, and a first gain adjustment section 70 for adjusting a gain used by the multiplier section 68.

In FIG. 2, the subtraction section 62 calculates a deviation of generator output with respect to a generator output set value. Here, "gas turbine output" refers to power generated by the rotational power of the turbine 24 being transmitted to the generator 16, and, for example, a value obtained by subtracting steam turbine output from the generator output is used. The deviation calculated by the subtraction section 62 is input to the multiplier section 68 of the peak suppression section 66. The multiplier section 68 multiplies the deviation from the subtraction section 62 by a predetermined gain given by the first gain adjustment section 70, and outputs the calculation result to the PI control section 64. The PI control section 64 obtains the first fuel control command by performing proportional integral calculation on the result output from the multiplier section 68, and outputs the first fuel control command obtained. As described above, this first fuel control command is handed over to a subsequent process, and is referred to, and used as an element, at the time of deciding the amount of adjustment with respect to the degree of opening of the flow rate adjustment valve 42 (see FIG. 1).

Figure 3:
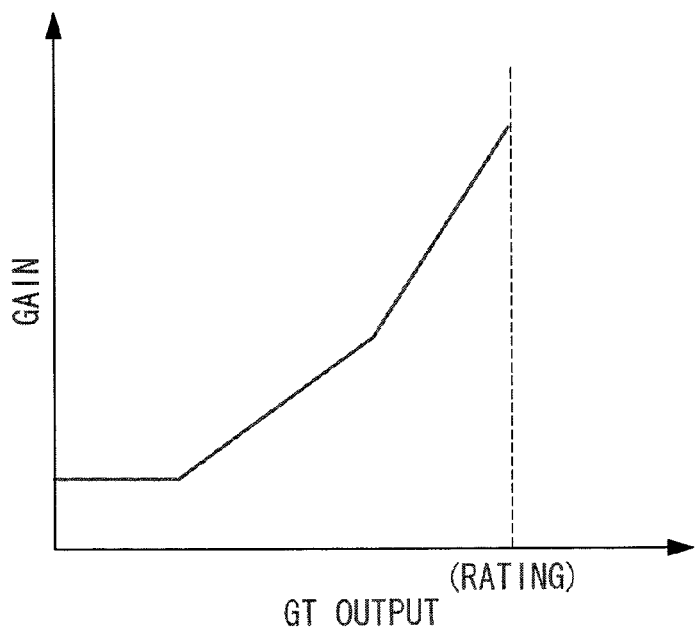
FIG. 3 is a diagram showing an example of first information in which gas turbine output and a gain are associated with each other.

As shown in FIG. 3, the first gain adjustment section 70 has first information in which gas turbine output and a gain are associated with each other, and a gain according to gas turbine output is acquired from the first information. The gain is set such that the gain given at the time of partial load is smaller than the gain given at the time of rated load. The partial load is a load smaller than the rated load, and specifically, it refers to a load region equal to or below 50% of the rated load. Also, more preferably, the gain is increased according to the increase in the gas turbine output.

Figure 4:
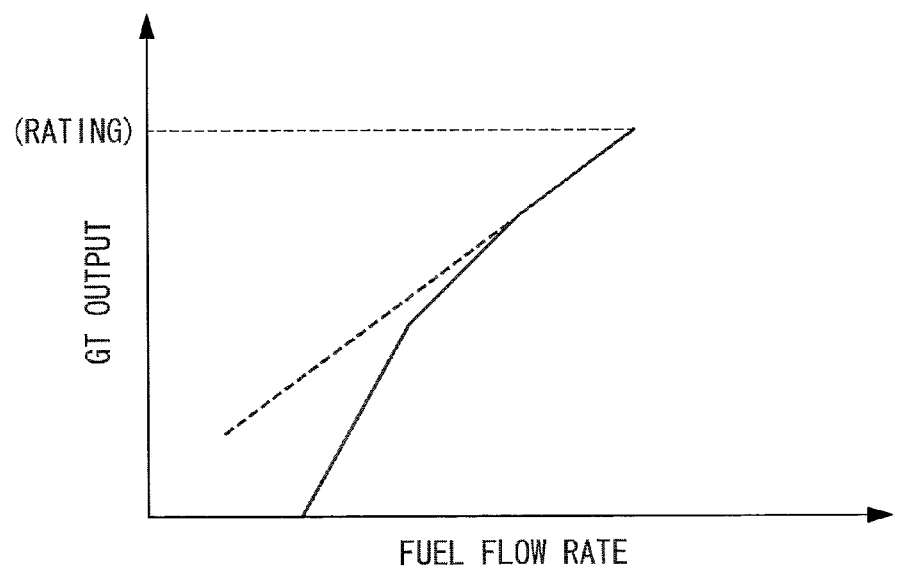
FIG. 4 is a characteristic diagram showing characteristics of a fuel flow rate and gas turbine output.

Now, FIG. 4 shows the characteristics of a fuel flow rate and gas turbine output. In FIG. 4, the horizontal axis is the fuel flow rate, and the vertical axis is the gas turbine output. As shown in FIG. 4, the slope of the gas turbine output is steep when the fuel flow rate is low, and the slope of the gas turbine output becomes less steep as the fuel flow rate becomes higher. Accordingly, it can be seen from the graph of FIG. 4 that, in a region where the fuel flow rate is low, the sensitivity of the gas turbine output is high and the gas turbine output (load) is more liable to fluctuate. Therefore, by setting a gain lower than rating in a region where the sensitivity of the gas turbine output is high with respect to the fuel flow rate, the stability of control can be increased and hunting of the load can be suppressed. Also, since the output is stable at the rated load or in a region near the rated load, a high gain can be set so as to enhance the following capability.

Furthermore, the gain at the first gain adjustment section 70 is set to be an appropriate value by linear analysis of the utility grid including the generator 16. In the following, a method of setting the gain will be described.

Figure 5:
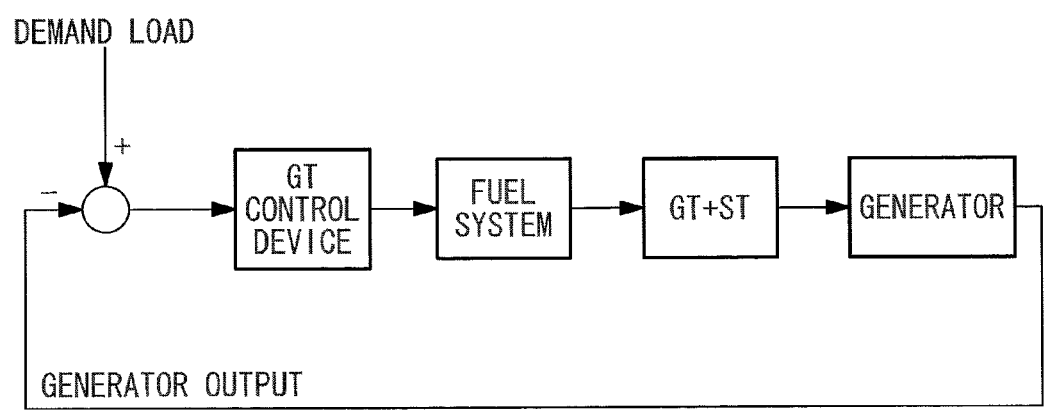
FIG. 5 is a diagram showing a linear model where a GTCC is divided into four parts.

First, as shown in FIG. 5, the GTCC is divided into four parts, i.e. a gas turbine control device, a fuel system, a gas turbine and a steam turbine, and a generator, and respective linear models are obtained. An example of a transfer function for the linear model of each part is shown below.

Gas turbine control device (First control section):

{Math. 1}

$$\text{Fuel system: } y = a \times K\left(1 + \frac{1}{Ts}\right) \times b(MWe - LDSET) \quad (1)$$

{Math. 2}

$$\text{Gas turbine and steam turbine: } y = \frac{k_{fp}}{T_{fp}s + 1} \times \frac{-(L_{fp}/2)s + 1}{(L_{fp}/2)s + 1} x \quad (2)$$

{Math. 3}

$$\text{Generator: } y = k_{gs} \times \frac{\omega_{gs}^2}{s^2 + 2\zeta_{gs}s + \omega_{gs}^2} x \quad (3)$$

{Math. 4}

$$y = k_{gen} \times \frac{\omega_{gen}^2}{s^2 + 2\zeta_{gen}s + \omega_{gen}^2} x \quad (4)$$

In the model of Equation (1) for the gas turbine control device, a is a gain of the PI control section, b is a gain of the multiplier section, K is a gain of the PI control section, T is an integration time constant of the PI control section, MWe is generator output, and LDSET is a generator output set value. In the model of Equation (2) for the fuel system, $k_{fp}$ is a gain from the fuel flow rate command CSO to an actual fuel flow rate, $T_{fp}$ is a time constant of the fuel system, and $L_{fp}$ is a dead time of the fuel system. In the model of Equation (3) for the gas turbine and the steam turbine, $k_{gs}$ is a gain from the fuel flow rate to output, $\zeta_{gs}$ is a damping constant of the gas turbine and the steam turbine, and $\omega_{gs}$ is an angular frequency of the gas turbine and the steam turbine. In the model of Equation (4) for the generator, $k_{gen}$ is a gain from mechanical output to generator output, $\zeta_{gen}$ is a damping constant of the generator, and $\omega_{gen}$ is an angular frequency of the generator.

Figure 12:
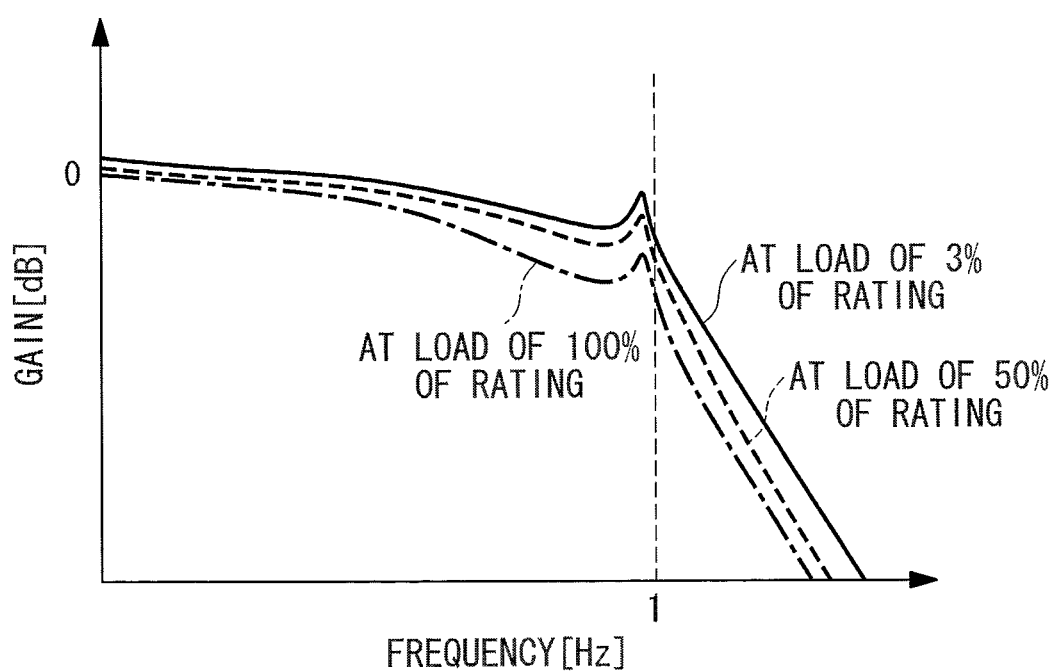
FIG. 12 is a diagram showing an example of amplitude characteristics of a utility grid including a generator.

Now, a loop transfer function is obtained using the transfer function, a bode plot is drawn, and amplitude characteristics and phase characteristics are obtained. Then, a plurality of amplitude characteristics and phase characteristics (frequency response characteristics) are obtained by assigning the values of gas turbine output MWe and gain b in Equation (1), and gain b according to which a peak gain (dB), a gain margin (dB) and a phase margin (deg) of the gas turbine output satisfy all of predetermined conditions set for the peak gain, the gain margin and the phase margin is extracted as an optimum gain from the results. Then, first information shown in FIG. 3 is created by associating the extracted optimum gain b and the gas turbine output. The amplitude characteristics shown in FIG. 12 are also obtained by the method described above.

As described above, according to the gas turbine control device of the present embodiment, when the gas turbine output is low, such as when starting or loading, the deviation of the generator output with respect to the generator output set value is multiplied by a gain that is smaller compared to at the time of rated load, and the hunting in the generator output can be suppressed and stable operation can be realized. Also, by increasing the gain as the gas turbine output increases, the following capability can be enhanced while maintaining the stability of control.

Figure 6:
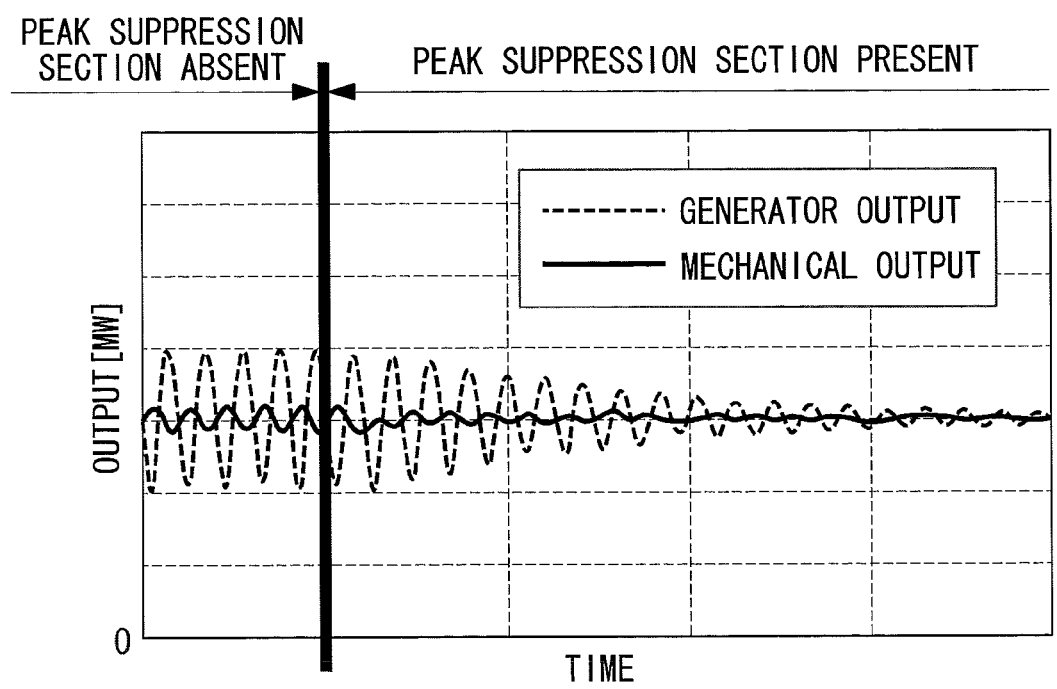
FIG. 6 is a diagram showing, while comparing, results of simulation regarding generator output and mechanical output of a gas turbine and a steam turbine where a feedback control section of a gas turbine control device according to the first embodiment of the present invention does not include a peak suppression section and where the feedback control section includes a peak suppression section.

FIG. 6 is a diagram showing, while comparing, results of simulation regarding generator output and mechanical output where the feedback control section 60 does not include the peak suppression section 66 and where the feedback control section 60 includes the peak suppression section 66. As can be seen from FIG. 6, hunting persists if the peak suppression section is not provided, but if the peak suppression section is provided, hunting is gradually reduced, and stable output is obtained after a predetermined time has elapsed. As described, according to the gas turbine control device of the present embodiment, hunting in the generator output can be suppressed.

Second Embodiment

Figure 7:
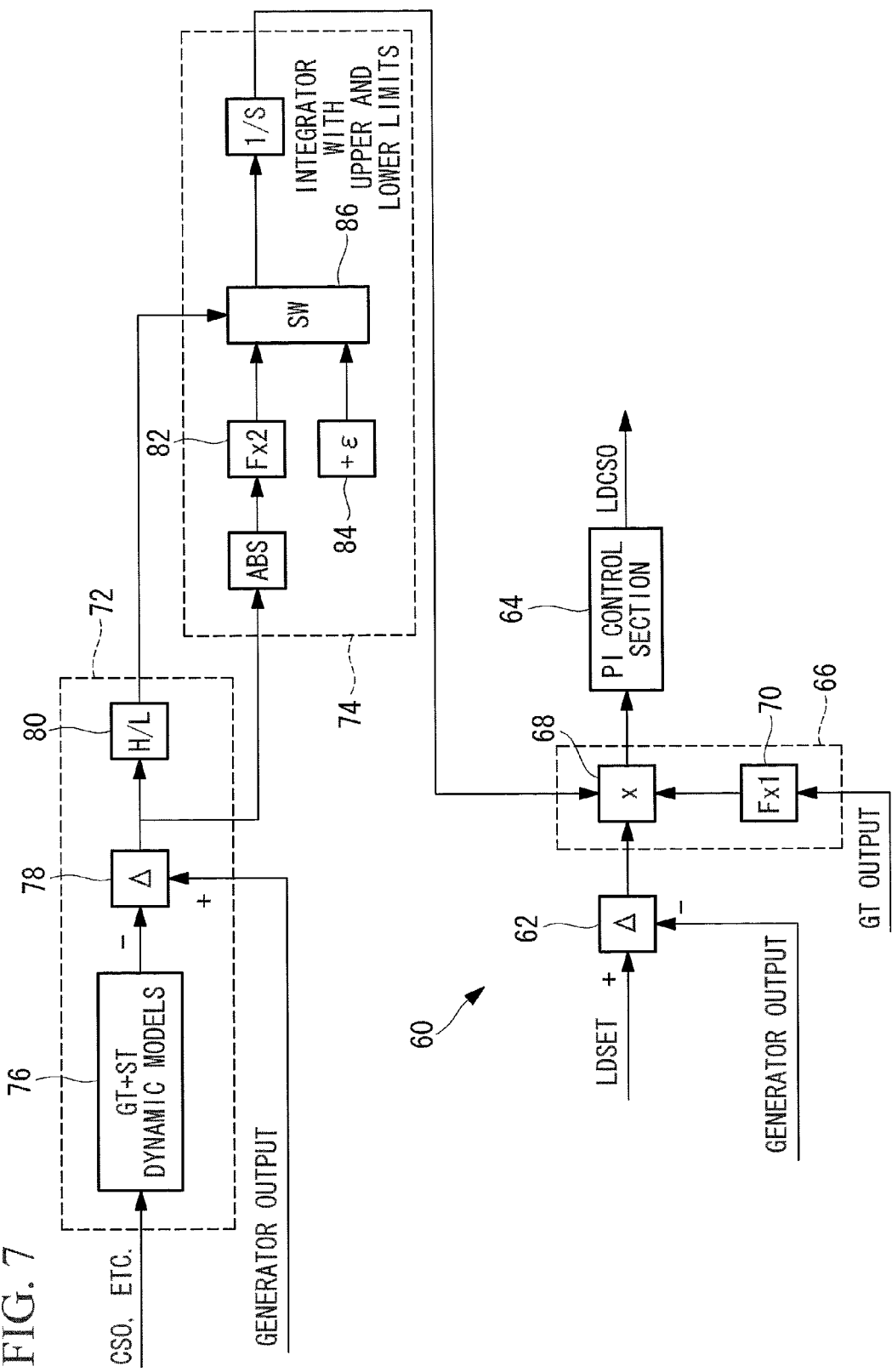
FIG. 7 is a functional block diagram of a first control section provided in a gas turbine control device according to a second embodiment of the present invention.

Next, a second embodiment of the present invention will be described with reference to FIG. 7. As shown in FIG. 7, with a gas turbine control device according to the present embodiment, the first control section of the gas turbine control device according to the first embodiment described above further includes a hunting determination section 72 and a second gain adjustment section 74. The hunting determination section 72 is a means for determining whether or not hunting is occurring in generator output, and includes a generator output estimation section 76, a subtraction section 78 and a comparison section 80, for example. The generator output estimation section 76 holds dynamic models of a gas turbine and a steam turbine, and estimates generator output based on a fuel flow rate command CSO (the fuel flow rate command output from the flow rate control section 46 shown in FIG. 1) input as an input signal or the like. The subtraction section 78 calculates a deviation ΔMW of generator output with respect to a generator output estimation value output from the generator output estimation section 76. The comparison section 80 determines whether or not the deviation ΔMW calculated by the subtraction section 78 is equal to or greater than a predetermined threshold that is set in advance, and outputs a Hi signal if the deviation is equal to or greater than the threshold, and outputs a Lo signal if the deviation is below the threshold.

Figure 8:
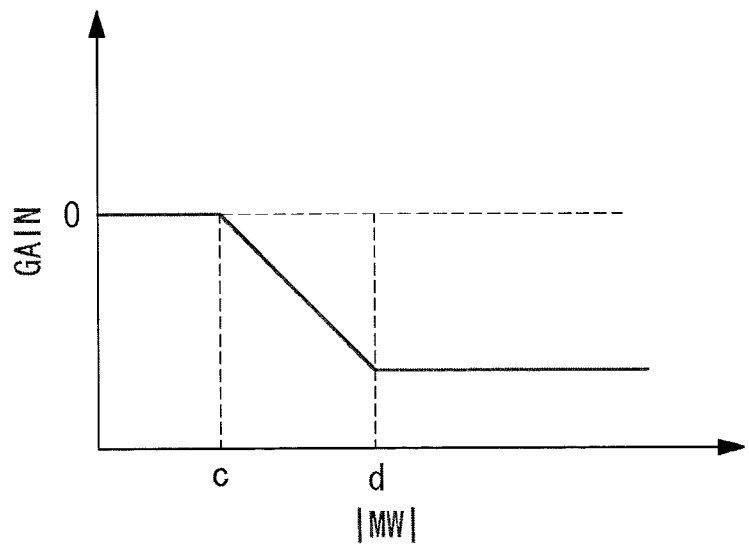
FIG. 8 is a diagram showing a table, held in a first function section shown in FIG. 7, in which an absolute value of a deviation and a gain are associated with each other.

The second gain adjustment section 74 includes a first function section 82, a second function section 84 and a gain switching section 86 as the main components. An absolute value of the deviation ΔMW, which is the output of the subtraction section 78 of the hunting determination section 72, is input to the first function section 82, and the first function section 82 outputs a gain that is in accordance with the absolute value |ΔMW|. For example, as shown in FIG. 8, the first function section 82 has a function set therein, according to which a range where the absolute value |ΔMW| of the deviation is equal to or smaller than a predetermined value c is made a dead zone, a negative gain is increased as the absolute value of the deviation becomes greater in a region where the absolute value is equal to or greater than c and below d, and a negative gain is made constant in a region where the absolute value is equal to or greater than d. On the other hand, the second function section 84 outputs a predetermined gain +ε that is set in advance. The gain switching section 86 selects and outputs the gain output from the first function section 82, if hunting is determined by the hunting determination section 72 to be occurring, that is, if a Hi signal is input from the comparison section 80, and selects and outputs the gain output from the second function section 84, if hunting is determined to not be occurring, that is, if a Lo signal is input from the comparison section 80.

The gain output from the gain switching section 86 is output to the multiplier section 68 provided in the feedback control section 60 via an integrator in which upper and lower limits are set. The deviation of the gas turbine output with respect to the gas turbine output set value is thereby multiplied by two gains, i.e. the gain output from the first gain adjustment section 70 and the gain output from the second gain adjustment section 74, and the calculation result is output to the PI control section 64.

As described above, according to the gas turbine control device of the present embodiment, if hunting occurs in generator output, the second gain adjustment section 74 reduces the gain set by the first gain adjustment section 70, and the gain can be adjusted in the direction of suppressing the hunting and the hunting in the gas turbine output can be reliably prevented. Also, if hunting is not occurring, it is decided that stable control is realized and the gain set by the first gain adjustment section 70 is increased, and the following capability can be thereby enhanced.

Third Embodiment

Next, a third embodiment of the present invention will be described with reference to the drawings. A gas turbine control device according to the present embodiment is different from the first embodiment described above with respect to the configuration of the peak suppression section provided in the feedback control section of the first control section. In the following, the difference to the first embodiment will be mainly described.

Figure 9:
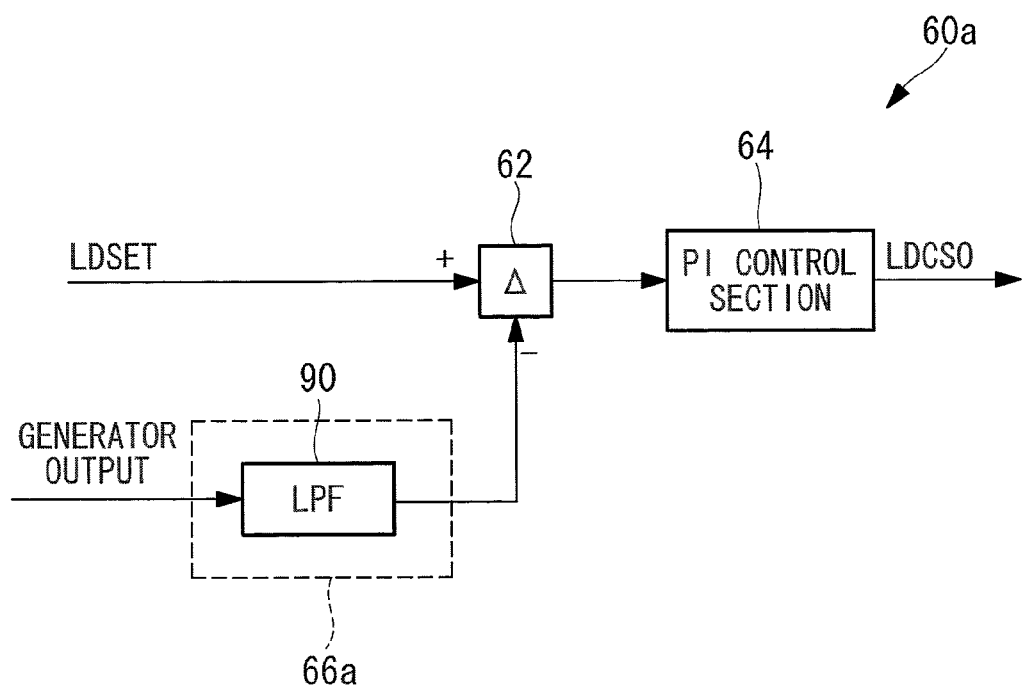
FIG. 9 is a functional block diagram of a first control section provided in a gas turbine control device according to a third embodiment of the present invention.

FIG. 9 is a diagram showing a functional block diagram of a first control section according to the third embodiment of the present invention. The first control section according to the present embodiment includes a low-pass filter 90 as a peak suppression section 66a. It can be seen from the amplitude characteristics shown in FIG. 12 that a peak is present near 1 Hz. Therefore, in the present embodiment, a low-pass filter that cuts off a frequency band of 1 Hz where a gain peak appears in the amplitude characteristics or higher is adopted as the peak suppression section 66a. A transfer function of a first order lag element expressed by Equation (5) below, for example, is set in the low-pass filter 90.

{Math. 5}

$$y = \frac{1}{Ts+1} x \quad (5)$$

In Equation (5) above, a time constant T is preferably set to be equal to or greater than 0.3 and equal to or smaller than 0.6.

With a feedback control section 60a shown in FIG. 9, generator output is input to the low-pass filter 90, and gas turbine output where a signal of a high frequency band of about 1 Hz or higher is cut off is input to the subtraction section 62. A deviation, with respect to a generator output set value, of generator output which has passed through the low-pass filter is calculated at the subtraction section 62, and proportional integral calculation is performed on the deviation and a first fuel flow rate command is thereby calculated at the PI control section 64.

As described above, according to the gas turbine control device of the present embodiment, since the first fuel control command is created by adopting the low-pass filter 90 that cuts off a frequency band where a peak appears in the amplitude characteristics of the GTCC shown in FIG. 12 as the peak suppression section 66a, and performing PI control on a difference between generator output which has passed through the low-pass filter and from which the high frequency component is removed and a generator output set value, the natural oscillation of the generator can be directly suppressed, and hunting in the generator output can be effectively suppressed. Also, since no influence is exerted on a frequency band of about 0.2 Hz or nearby that is necessary for gas turbine output control, the stability of control can be maintained.

Figure 10:
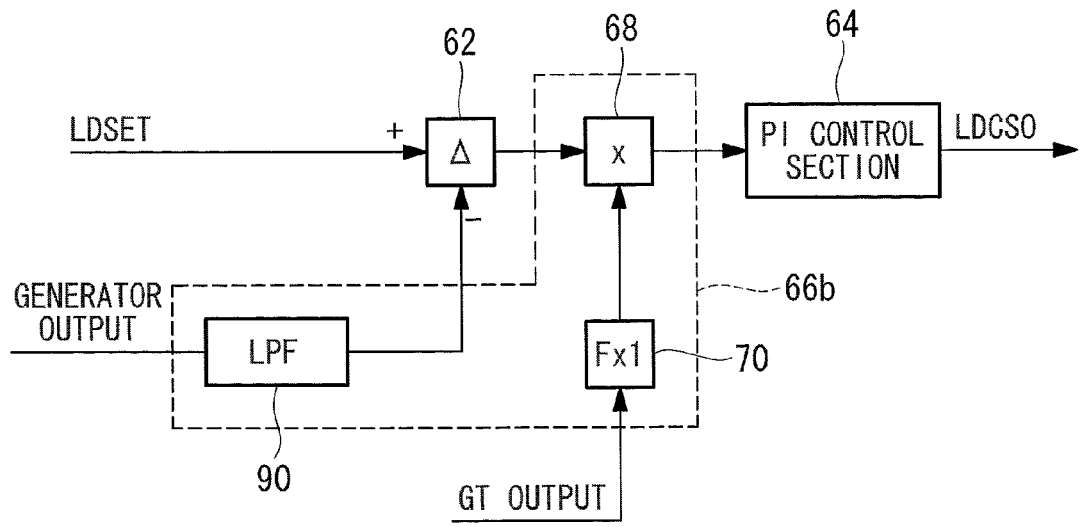
FIG. 10 is a functional block diagram of a first control section provided in a gas turbine control device according to another embodiment of the present invention.

As shown in FIG. 10, it is also possible to combine the gas turbine control device according to the present embodiment and the gas turbine control device according to the first embodiment. In this case, a difference between generator output whose high frequency component has been cut off by the low-pass filter 90 and a generator output set value is calculated by the subtraction section 62, this difference is multiplied by a gain according to gas turbine output by the multiplier section 68, and PI control is performed based on the calculation result, and the first fuel control command is thereby obtained.

According to such a configuration, since the gain is increased in a low frequency band lower than about 1 Hz, the following capability of the gas turbine output with respect to a demand load (a generator output set value) can be enhanced and a peak can be suppressed by the cutting off of a high frequency band of about 1 Hz or higher, and the stability of control can be increased.

Fourth Embodiment

Next, a fourth embodiment of the present invention will be described with reference to the drawings. A gas turbine control device according to the present embodiment is different from the first embodiment with respect to the configuration of the peak suppression section of the feedback control section of the first control section. In the following, the difference to the first embodiment will be mainly described.

Figure 11:
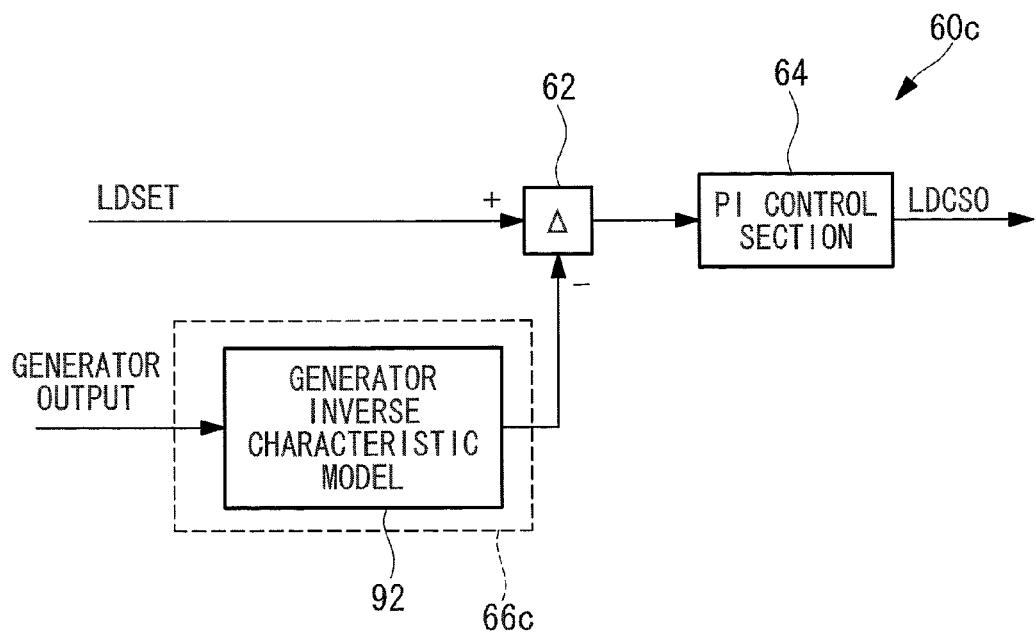
FIG. 11 is a functional block diagram of a first control section provided in a gas turbine control device according to a fourth embodiment of the present invention.

FIG. 11 is a diagram showing a functional block diagram of a first control section according to the fourth embodiment of the present invention. The first control section according to the present embodiment includes a calculation section 92 as a peak suppression section 66c. Specifically, a transfer function for an inverse characteristic model of a generator is set in the calculation section 92. For example, the transfer function is expressed by Equation (6) below.

{Math. 6}

$$MWm = \frac{s^2 + (D/M)s + (K/M)\omega_0}{(D/M)s + (K/M)\omega_0} MWe \quad (6)$$

In Equation (6) above, MWm is mechanical output, MWe is generator output, that is, generator output assuming that only the mechanical output of the gas turbine is transmitted to the generator, D is a damping factor, K is a synchronizing factor, and M is an inertia constant.

Here, it is assumed that the cause of the peak in the amplitude characteristics shown in FIG. 12 is the excitation of oscillation at the natural frequency of the generator. Accordingly, by providing, as the peak suppression section 66c, the calculation section 92 in which a transfer function for an inverse characteristic model of the generator is set, a component associated with the generator that is included in the output can be removed, and only the mechanical output can be obtained. That is, according to the feedback control section 60c of the present embodiment, generator output is input to the calculation section 92, a component associated with the generator that is included in the generator output is removed, and the mechanical output is estimated and is output. This mechanical output is input to the subtraction section 62, and a deviation from a generator output set value is calculated. The deviation which has been calculated is input to the PI control section 64, and the first fuel control command is calculated based on this deviation.

As described above, according to the gas turbine control device of the present embodiment, by setting a transfer function for an inverse characteristic model of the generator in the calculation section 92, the characteristics of the generator can be negated, and the mechanical output can be used as the input signal for the feedback control section 60c. As a result, a peak in the amplitude characteristics caused by the characteristics of the generator can be removed, and hunting in the generator output which is mainly caused by the generator can be suppressed.

REFERENCE SIGNS LIST

12 Gas turbine
14 Steam turbine
16 Generator
42 Flow rate adjustment valve
44 Gas turbine control device
50 First control section
60, 60a, 60c Feedback control section
62 Subtraction section
64 PI control section
66, 66a, 66b, 66c Peak suppression section
68 Multiplier section
70 First gain adjustment section
72 Hunting determination section
74 Second gain adjustment section
90 Low-pass filter
92 Calculation section

The invention claimed is:

1. A gas turbine control device to be used in a generating facility including a gas turbine and a generator for generating power when at least rotational power of the gas turbine is transmitted, the gas turbine control device comprising:
   a first control section for obtaining a first fuel control command for causing generator output to follow a generator output set value decided based on a demand load,
   wherein the first control section includes a feedback control section, and
   wherein the feedback control section includes
      a subtraction section for calculating a deviation of the generator output with respect to the generator output set value,
      a proportional integral calculation provided in a later stage of control than the subtraction section, and
      a peak suppression section for suppressing a peak in amplitude characteristics of the generator or a utility grid including the generator.

2. The gas turbine control device according to claim 1,
   wherein the peak suppression section includes
      a multiplier section, provided between the subtraction section and the proportional integral calculation, for multiplying an input signal by a gain, and
      a first gain adjustment section for adjusting the gain of the multiplier section according to output of the gas turbine, and
   wherein the first gain adjustment section sets a gain given at a time of partial load below a rated load to be smaller than a gain given at a time of the rated load.

3. The gas turbine control device according to claim 2, wherein the first gain adjustment section increases the gain according to an increase in gas turbine output.

4. The gas turbine control device according to claim 2,
   wherein the first control section includes
      a hunting determination section for determining whether or not hunting is occurring in the generator output, and
      a second gain adjustment section for reducing the gain set by the first gain adjustment section, if hunting is determined by the hunting determination section to be occurring.

5. The gas turbine control device according to claim 4, wherein, if the hunting is determined by the hunting determination section to not be occurring, the second gain adjustment section increases the gain set by the first gain adjustment section.

6. The gas turbine control device according to claim 2, wherein the peak suppression section further includes a low-pass filter that cuts off a signal of a predetermined frequency or higher where a peak is present in the amplitude characteristics, and outputs generator output which has been filtered to the subtraction section of the feedback control section.

7. The gas turbine control device according to claim 1,
   wherein the peak suppression section includes a low-pass filter to which the generator output is input as an input signal and that cuts off a signal, included in the input signal, of a predetermined frequency or higher where a peak is present in the amplitude characteristics, and
   wherein generator output which has passed through the low-pass filter is input to the subtraction section.

8. The gas turbine control device according to claim 1,
   wherein the peak suppression section includes a calculation section in which a transfer function for an inverse characteristic model of the generator is set, and
   wherein generator output which has passed through the calculation section is input to the subtraction section.

9. A generating system comprising:
   a gas turbine; and
   a gas turbine control device according to claim 1.

10. The gas turbine control device according to claim 3,
   wherein the first control section includes
      a hunting determination section for determining whether or not hunting is occurring in the generator output, and
      a second gain adjustment section for reducing the gain set by the first gain adjustment section, if hunting is determined by the hunting determination section to be occurring.

11. The gas turbine control device according to claim 10, wherein, if the hunting is determined by the hunting determination section to not be occurring, the second gain adjustment section increases the gain set by the first gain adjustment section.

12. The gas turbine control device according to claim 3, wherein the peak suppression section further includes a low-pass filter that cuts off a signal of a predetermined frequency or higher where a peak is present in the amplitude characteristics, and outputs generator output which has been filtered to the subtraction section of the feedback control section.

13. The gas turbine control device according to claim 4, wherein the peak suppression section further includes a low-pass filter that cuts off a signal of a predetermined frequency or higher where a peak is present in the amplitude characteristics, and outputs generator output which has been filtered to the subtraction section of the feedback control section.

14. The gas turbine control device according to claim 5, wherein the peak suppression section further includes a low-pass filter that cuts off a signal of a predetermined frequency or higher where a peak is present in the amplitude characteristics, and outputs generator output which has been filtered to the subtraction section of the feedback control section.

15. The gas turbine control device according to claim 10, wherein the peak suppression section further includes a low-pass filter that cuts off a signal of a predetermined frequency or higher where a peak is present in the amplitude characteristics, and outputs generator output which has been filtered to the subtraction section of the feedback control section.

16. The gas turbine control device according to claim 11, wherein the peak suppression section further includes a low-pass filter that cuts off a signal of a predetermined frequency or higher where a peak is present in the amplitude characteristics, and outputs generator output which has been filtered to the subtraction section of the feedback control section.

* * * * *